Sept. 23, 1930.  J. M. TALBOT  1,776,525
SHAFT ASSEMBLY
Filed Nov. 27, 1929
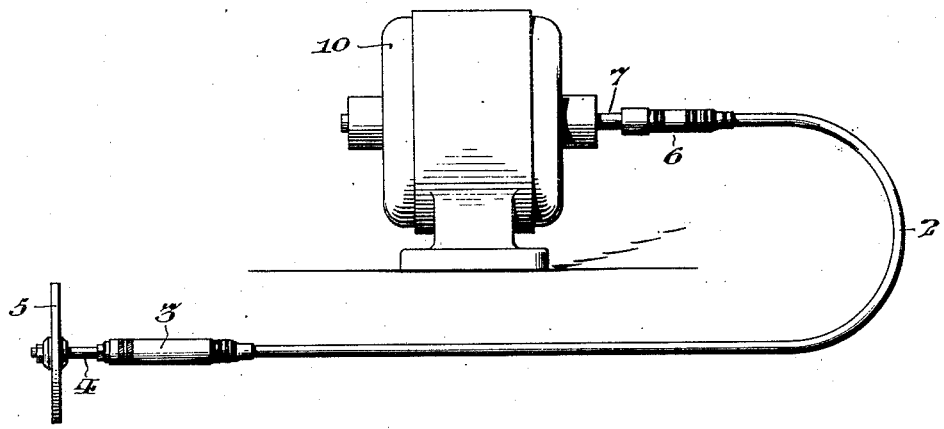
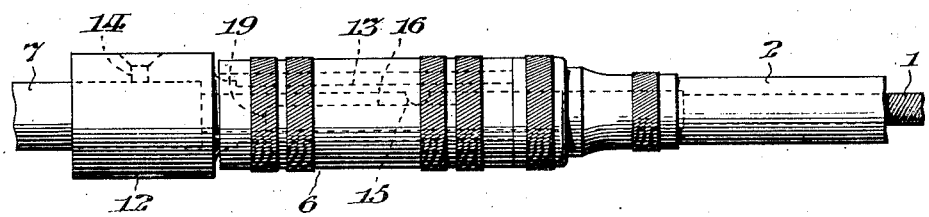
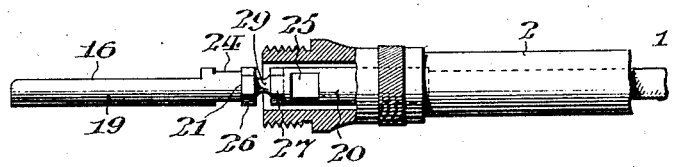
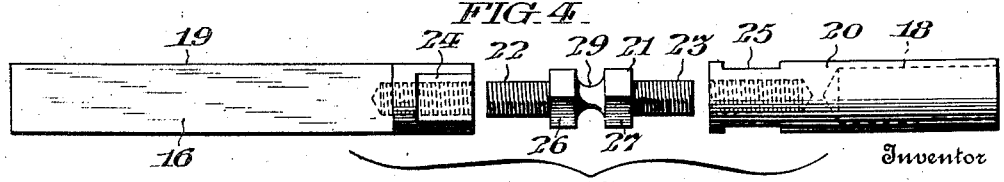
Inventor
James M. Talbot,
By Clifton C. Hallowell
Attorney Patented Sept. 23, 1930

1,776,525

UNITED STATES PATENT OFFICE

JAMES M. TALBOT, OF DONGAN HILLS, NEW YORK, ASSIGNOR TO THE S. S. WHITE DENTAL MANUFACTURING COMPANY, A CORPORATION OF PENNSYLVANIA

SHAFT ASSEMBLY

Application filed November 27, 1929. Serial No. 410,082.

This invention relates particularly to flexible shaft assemblies, and is particularly advantageous for employment with flexible shafting systems such as are employed in industrial fields.

It is well known that the flexible shafting systems of this type comprise expensive elements, and in the event of breakage it is necessary to accomplish an expensive replacement of one or another element, and oftentimes this repair requires a factory or machine shop fitting, unless an entire new cable and shaft end assembly is at hand. This causes both a great expense and a loss of time awaiting the repair.

According to the present invention, the expensive elements of the shafting system are protected and rendered safe against breakage by the employment of a renewable frangible safety coupling in the system. An illustrative form of the invention is set forth on the accompanying drawing and described hereinafter with respect to a flexible shafting system for industrial use.

In the accompanying drawings, Figure 1 is an elevational view of a motor, flexible shaft, and tool comprising a grinding wheel for convenience of illustration; Fig. 2 is a side elevational view of the motor end fitting of the flexible shaft showing a fragment of the shaft and its casing and a fragment of the motor spindle; Fig. 3 is a sectional elevational view of the motor end of the flexible shaft, with parts of the end fitting removed for convenience of illustration; and Fig. 4 is an enlarged disassembled view of the flexible shaft terminal connector including a safety frangible coupling constructed according to this invention.

In said drawings the shaft 1, which is enclosed within the casing 2, has the chuck fitting 3 with which the spindle 4 of the tool 5 is engaged, and has the motor coupling fitting 6 detachably connected with the spindle 7 of the motor 10.

As best shown in Fig. 2, said coupling fitting 6 comprises the rotatable socket member 12 arranged to receive and engage the motor spindle 7 and has the hollow shank 13 rotatably fitted in the coupling fitting 6 and provided with a transverse key 15 arranged to engage the flat surface 16 of the flexible shaft terminal connector 17, so as to cause the flexible shaft 1 to rotate with the motor spindle 7 when said motor spindle is rigidly engaged with the rotatable socket member 12 by the set-screw 14.

As shown in Figs. 3 and 4, the flexible shaft terminal connector 17 comprises the flat sided tang 19, the thimble 20 and the frangible coupling 21, said frangible coupling being provided with oppositely extended threaded shanks 22 and 23 arranged to be respectively engaged in correspondingly threaded sockets in the adjacent ends of the tank 19 and the thimble 20 having the socket 18 in which the flexible shaft is engaged. The shaft terminal connector parts comprising the tank 19 and the thimble 20 are provided with flats 24 and 25 to receive wrenches or similar tools for the assembly operation. while the safety frangible coupling 21 is provided with hexagonal portions 26 and 27 for the same purpose.

The frangible safety coupling 21 is provided between the hexagonal portions 26 and 27 with a reduced section 29 having a lesser torsional strength than the weakest portion of the shafting system, so that in the event of blockage in the operation of the tool 5, the shafting system will fail by torsional breaking of the safety coupling 21 at the reduced section 29.

In the event of such breakage, the shaft terminal connector members comprising the tang 19 and thimble 20 are separated, and by application of wrenches to the flats 24 and 25 and hexagonal portions 26 and 27, the broken parts of the frangible coupling 21 may be removed and a new coupling be inserted. It will particularly be noted that these connectors may be made very cheaply and the cost of keeping such members on hand is very small.

It is preferred that the external diameter of the hexagonal portions 26 and 27 shall be less than the external diameter of the tang 19 and thimble 20 adjacent thereto; so that it is possible to substitute a sub-assembly comprising the terminal connector 17 including the frangible coupling 21 even in tool holders already existing with solid shafting connecting the flexible shafting 1 and the motor spindle 7, whereby this safety feature may be incorporated in a repair of present machines.

The screw threads 22 and 23 are designed to be tightened during the rotation of the shaft 1 as a result of any resistance opposed at the tool 5 through the chuck 3.

I do not desire to limit my invention to the precise details of construction and arrangement as herein set forth, as it is obvious that various modifications may be made therein without departing from the essential features of my invention as defined in the appended claims.

Having thus described my invention, I claim:

1. A shaft assembly comprising a motor end and a tool end, and a replaceable frangible safety coupling interposed between said ends and having driving connections therewith, said frangible coupling having a portion of lesser torsional strength than said ends and connections.

2. A device of the class described including flexible shafting, a motor shaft end secured to said shafting, a tool shaft end having means thereon to attach a tool, and a renewable frangible safety coupling interposed between said shaft ends and having driving connections therewith, said coupling including a portion of small diameter and lesser torsional strength than said shafting, connections and ends.

3. A device of the class described including flexible shafting, a motor shaft end secured to said shafting, a tool shaft end and tool attaching means driven thereby, and a renewable frangible safety coupling interposed between said shaft ends and threadedly engaged therewith, the external diameter of said coupling being less than the outside diameter of the adjacent portions of said shaft ends, said coupling having a portion of lesser torsional strength than said shafting and ends.

4. A frangible safety coupling for interposition between the internally threaded ends of two pieces of shafting, comprising portions adapted to be turned by a wrench, reduced threaded extensions connected to each of said portions to engage a respective piece of shafting, and a portion of less diameter than said threaded ends joining said wrench-engageable portions.

In testimony whereof, I have hereunto set my hand this twenty-fifth day of November, A. D. 1929.

JAMES M. TALBOT.